Aug. 31, 1943.　　　　L. B. BRAGG　　　　2,327,993
VAPOR AND LIQUID CONTACT APPARATUS
Filed Nov. 4, 1940

INVENTOR
LESLIE B. BRAGG.
BY
ATTORNEY

Patented Aug. 31, 1943

2,327,993

UNITED STATES PATENT OFFICE 2,327,993

VAPOR AND LIQUID CONTACT APPARATUS

Leslie B. Bragg, Scotch Plains, N. J., assignor to Foster Wheeler Corporation, New York, N. Y., a corporation of New York Application November 4, 1940, Serial No. 364,122

7 Claims. (Cl. 261—114)

This invention relates to liquid and vapor contact apparatus, and particularly pertains to improvements in bubble trays.

In prior types of bubble trays in which the flow of liquid is reversed from tray to tray as the liquid flows downwardly through the vapor and liquid contacting apparatus, the liquid on an upper tray near the entrance to the downcomer on that tray, is almost identical in composition with the liquid on the tray next below in the region adjacent the outlet end of the downcomer mentioned, while the liquid on the second tray next below is materially different in composition from the liquid on the first two trays mentioned. In other words, considering regions in vertical alignment adjacent the downcomers on alternate trays, the composition of the liquid on adjacent trays at the inlet and outlet ends of the same downcomers will be substantially the same, while the liquid on adjacent trays at the outlet end of one downcomer and the inlet end of another downcomer will be materially different.

The present invention avoids this variation in the relationship between the composition of the liquids on various trays at points disposed substantially vertically above or below one another.

The invention will be understood from the following description when considered in connection with the accompanying drawing forming a part thereof, and in which.

Like characters of reference refer to the same or to similar parts in the several views.

Although the invention will be disclosed as embodied in fractionating columns for the distillation and rectification of composite liquids such as petroleum or animal or vegetable oils, it will be understood that the invention is applicable generally to the treatment of liquids and vapors.

Figure 2:
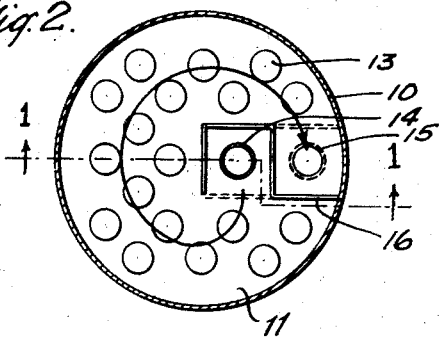
Fig. 2 is a transverse sectional view taken on line 2—2 of Fig. 1.
Figure 3:
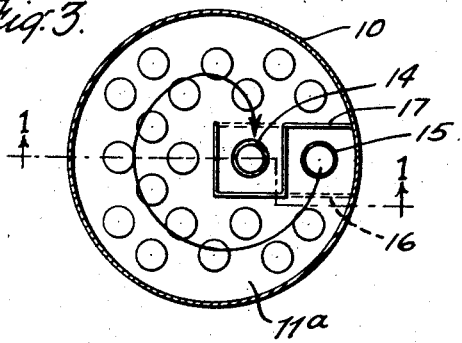
Fig. 3 is a transverse sectional view taken on line 3—3 of Fig. 1.
Figure 1:
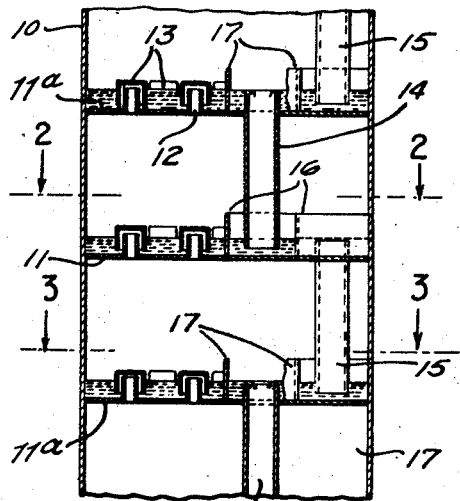
Fig. 1 is a diagrammatic vertical sectional view of a fractionating column embodying the invention, taken on line 1—1 of Figs. 2 and 3.

Referring to the drawing, particularly Figs. 1, 2 and 3, reference character 10 designates the cylindrical shell of a fractionating column having a plurality of horizontal bubble trays 11 and 11a arranged alternately in superposed relationship. Each tray is provided with a plurality of spaced vapor risers 12 and bubble caps 13. Extending downwardly from each tray 11 at a point adjacent the wall of the shell, to within a short distance of the upper surface of each tray 11a, or to a point below the normal liquid level thereon, is a downcomer pipe 15. From each tray 11a, a downcomer pipe 14 located closely adjacent the downcomer 15 and radially inwardly thereof, extends downwardly to within a short distance of the upper surface of each tray 11 below the liquid level thereon. The arrangement of the downcomers is such that those connected with alternate trays are in vertical alignment, while those connected to adjacent trays are but slightly displaced radially from each other.

Liquid flow controlling devices are provided for each of the trays. As shown, these devices comprise vertical partitions or baffles which are disposed on each tray adjacent the downcomers associated therewith, and which extend upwardly from each tray to a point above the normal liquid level on the tray. The baffle 16 on each tray 11 is arranged and disposed to cause the liquid flowing onto the tray from a downcomer 14 to flow in a generally circular path on the tray to the downcomer 15, as illustrated in Fig. 2. The baffle 17 on each tray 11a is arranged and disposed to cause the liquid discharged onto the tray from a downcomer 15 to flow in a generally circular path on the tray to the downcomer 14, as illustrated in Fig. 3. For example, and as viewed in Fig. 2, the baffle 16 extends inwardly from the shell on the rear side of the downcomer 15, then at right angles between the downcomers 14 and 15, then inwardly adjacent the downcomer 14 and parallel to the first mentioned part of the baffle, and then toward the rear side of the shell parallel to the second mentioned part of the baffle. The baffle 17 is similar to the baffle 16 excepting that it is reversed in position. With this arrangement, each of the downcomers is partly enclosed, that is, on three sides, so that the liquid flowing onto a tray from one of the downcomers is forced to flow generally in a predetermined circular direction, and liquid flowing on a tray is forced to follow generally a predetermined circular path to enter the downcomer connected with the tray.

In operation, liquid is introduced at the upper portion of the column and flows downwardly from tray to tray through the downcomers connected to each tray. Each downcomer has its upper end disposed at a predetermined distance above the tray to which it is connected to maintain a pool of liquid on each tray. Vapor is introduced into the column at the lower portion thereof and flows upwardly through the column, through the risers and the liquid on each tray. The liquid on each tray 11 flows over the tray from the point of delivery thereon under downcomer 14 to the downcomer 15 connected therewith in a substantially circular path in a clockwise direction, and the liquid on each tray 11a flows over the tray from the region of delivery thereon under the downcomer 15 to the downcomer 14 connected therewith in a substantially circular path and also in a clockwise direction.

Figure 4:
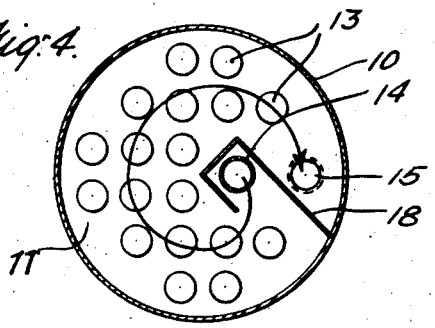
Fig. 4 is a diagrammatic transverse sectional view of a fractionating column embodying another form of the invention.
Figure 5:
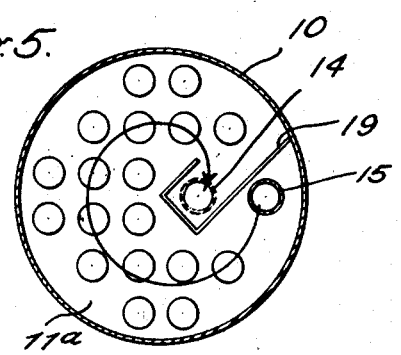
Fig. 5 is a transverse sectional view of the column shown in Fig. 4, taken on a line immediately below the tray shown in Fig. 4.

The trays 11 and 11a shown in Figs. 4 and 5, are the same as those shown in Figs. 1, 2 and 3 excepting for the baffles or partitions. In Figs. 4 and 5, the baffles are U-shaped in general with one leg longer than the other, the long leg extending from the shell 10 between the downcomers 14 and 15. On the trays 11, the baffle 18 extends from the rear side of the downcomer 15 as viewed in Fig. 4 to the far side of downcomer 14 and then extends at right angles to the approximate center of the tray and thence at right angles to a point on the rear side of the downcomer 14. On the trays 11a, the baffle 19 is in a reversed position. The operation is substantially the same as that described in connection with the form shown in Figs. 1, 2 and 3.

With this arrangement it will be perceived that the liquid flow on all trays is substantially superposed as to the point of origin and termination, as well as to direction. Hence, with this arrangement, the liquid will vary substantially uniformly in composition from tray to tray.

Figure 6:
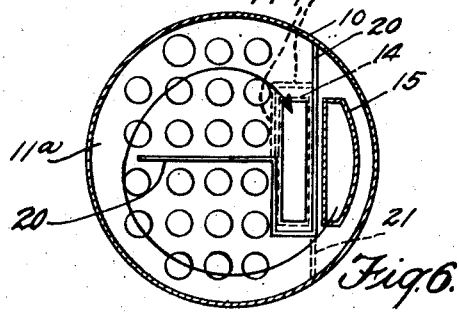
Fig. 6 is a transverse sectional view of a fractionating tower embodying a further form of the invention.

The invention is not limited to the particular forms illustrated. The downcomers may be rectangular or of any other configuration in transverse cross-section and they may be disposed more closely adjacent to each other, or to the wall of the shell, or both, if desired. The length of the partition, or the length of any or all of its several parts, may be varied as desired. For example, as shown in Fig. 6, the downcomer connected to one tray may be disposed adjacent the wall of the column and may be approximately segmental in cross-sectional configuration, with the downcomer on the tray above which delivers liquid to the one tray being of rectangular configuration in cross-section, and having its lower end closely adjacent the first mentioned downcomer, and with a baffle or partition on the one tray extending from the shell wall, between the first and second mentioned downcomers, along one end of the second mentioned downcomer, thence along the side of that downcomer to the center line of the tray and thence along the center line of the tray to a point short of the opposite side of the tray. The baffle on the next adjacent tray will be the same but will be reversed in position as in the forms of the invention illustrated.

Inasmuch as changes may be made in the form, location and relative arrangement of the several parts of the apparatus disclosed without departing from the principles of the invention, it will be understood that the invention is not to be limited excepting by the scope of the appended claims.

What is claimed is:

1. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, with the downcomer on one tray being disposed inwardly of the column in relation to the downcomers on the adjacent trays, the downcomers on alternate trays being disposed in vertical alignment, and a liquid flow directing baffle on each tray having a portion extending between the downcomers on adjacent trays and arranged and disposed to cause the liquid to flow in substantially the same direction on each tray from the outlet of one downcomer to the inlet of another.

2. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, with the downcomer on one tray being disposed inwardly of the column in relation to the downcomers on the adjacent trays, the downcomers on alternate trays being disposed in vertical alignment, and a liquid flow directing baffle on each tray arranged and disposed to cause the liquid delivered to each tray from the tray above to flow generally in a predetermined direction and to enter the downcomer on the tray after having made a substantial circuit of the tray with the direction of flow of the liquid on the several trays being substantially the same.

3. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, the downcomers on alternate trays being disposed in substantial vertical alignment inwardly of the column with respect to the downcomer on the other trays, and a liquid flow directing baffle on each tray extending from the wall of the column to a point on a line between the downcomers, thence at an angle between the downcomers to a point on the side of the downcomer disposed inwardly of the column and thereafter at an angle along another side of the last mentioned downcomer, the arrangement being such that the liquid delivered to each tray is caused to flow substantially around the tray in a direction which is substantially the same as the direction of flow of the liquid on the other trays in the column.

4. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, the downcomers on alternate trays being disposed in substantial vertical alignment inwardly of the column with respect to the downcomers on the other trays, and a liquid flow directing baffle on each tray extending from the wall of the column in a substantially straight line between the downcomers to a point adjacent the downcomer disposed inwardly of the column, thence at an angle along one side of the last mentioned downcomer and thereafter at an angle along another side of said downcomer, the arrangement being such that the liquid delivered to each tray is caused to flow substantially around the tray in a direction which is substantially the same as the direction of flow of the liquid on the other trays in the column.

5. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, with the downcomer on one tray being disposed inwardly of the column in relation to the downcomers on adjacent trays and the downcomers on alternate trays being in vertical alignment, and a liquid flow directing baffle on each tray arranged and disposed to cause the liquid on each tray to flow in a path which is in vertical alignment with the paths on the other trays and in the same direction, the point of origin and termination of the flow paths on the several trays being in vertical alignment.

6. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed in radial alignment with each other and the vertical axis of said column and the downcomers on alternate trays being in vertical alignment, and a liquid flow directing baffle on each tray arranged and disposed to cause the liquid on each tray to flow in a path which is substantially the same as the paths on the other trays.

7. Liquid and vapor contacting apparatus comprising a column, a plurality of superposed bubble trays in the column each having a substantially vertically extending downcomer through which liquid on the tray is delivered to the tray next below, the downcomers on adjacent trays being adjacently disposed, the downcomers on alternate trays being disposed in substantial vertical alignment inwardly of the column with respect to the downcomers on the other trays, and a liquid flow directing baffle on each tray extending from the wall of the column in a substantially straight line between the downcomers to a point adjacent the downcomer disposed inwardly of the column, thence at an angle along one side of the last-mentioned downcomer, thereafter at an angle along another side of the last-mentioned downcomer, and thence at an angle on the central portion of the tray to a point short of the inner wall of the column, the arrangement being such that the liquid delivered to each tray is caused to flow substantially around the tray in a direction which is substantially the same as the direction of flow of the liquid on the other trays in the column.

LESLIE B. BRAGG.